United States Patent [19]

Fenwick et al.

[11] Patent Number: 4,558,597

[45] Date of Patent: Dec. 17, 1985

[54] SURFACE TENSION SCREEN FAILURE DETECTION METHOD AND APPARATUS

[75] Inventors: James R. Fenwick, Chatsworth; Yi M. Chang, Woodland Hills, both of Calif.

[73] Assignee: The United States of America as represented by the Secretary of the Air Force, Washington, D.C.

[21] Appl. No.: 688,853

[22] Filed: Jan. 4, 1985

[51] Int. Cl.$^4$ ............................................ G01N 29/04
[52] U.S. Cl. .................................... 73/600; 73/290 B; 73/290 V
[58] Field of Search ................. 73/600, 599, 592, 627, 73/628, 629, 589, 290 B, 290 V, 149, 52, 64.4, 19; 367/908; 340/621

[56] References Cited

U.S. PATENT DOCUMENTS

| 3,019,650 | 2/1962 | Worswick | 73/290 V |
|---|---|---|---|
| 3,237,451 | 3/1966 | Haeff | 73/149 |
| 3,266,311 | 8/1966 | Andreasen et al. | 73/290 V |
| 3,413,847 | 12/1968 | Kraushaar | 73/290 B |
| 4,090,407 | 5/1978 | Shuler et al. | 73/290 V |
| 4,144,517 | 3/1979 | Baumoel | 73/290 V |
| 4,159,647 | 7/1979 | Paulsen et al. | 73/290 V |
| 4,221,004 | 9/1980 | Combs et al. | 367/114 |
| 4,501,146 | 2/1985 | Greenhalgh | 73/290 B |

OTHER PUBLICATIONS

"Location of Pipe Obstructions Using Ultrasonic Testing", W. S. Burkle, Materials Evaluation, 39, pp. 931-933, (Sep. 1981).

Primary Examiner—Stephen A. Kreitman
Attorney, Agent, or Firm—Donald J. Singer; Bobby D. Scearce

[57] ABSTRACT

Apparatus for detecting failure of a surface tension screen disposed between a holding chamber and a main chamber of a tank includes a fixture for supporting the tank in desired test orientations, a drive mechanism on the fixture for rotating the tank and an ultrasonic transducer used in making a measurement with respect to the position of an interface between liquid and gas contained in the holding chamber of the tank. The holding and main chambers are tandemly arranged along a longitudinal axis of the tank and are each substantially filled by a liquid propellant with respective volumes of gas contained in each chamber. The fixture supports the tank in a first orientation with a nose of the tank pointing downwardly and tank longitudinal axis extending approximately 60° above horizontal and to the right of vertical and in a second orientation with the tank nose pointing upwardly and tank longitudinal axis extending approximately 60° above horizontal and to the left of vertical. Separate measurements are made after rotation of the tank in each of these orientations. These measurements are indicative of the volumes of gas in the holding chamber at the respective orientations. Comparison of the measurements provides an assessment of the integrity of the surface tension screen. If the measurements are significantly different, then this indicates that gas leakage has taken place across the screen and that the screen has therefore failed.

15 Claims, 3 Drawing Figures

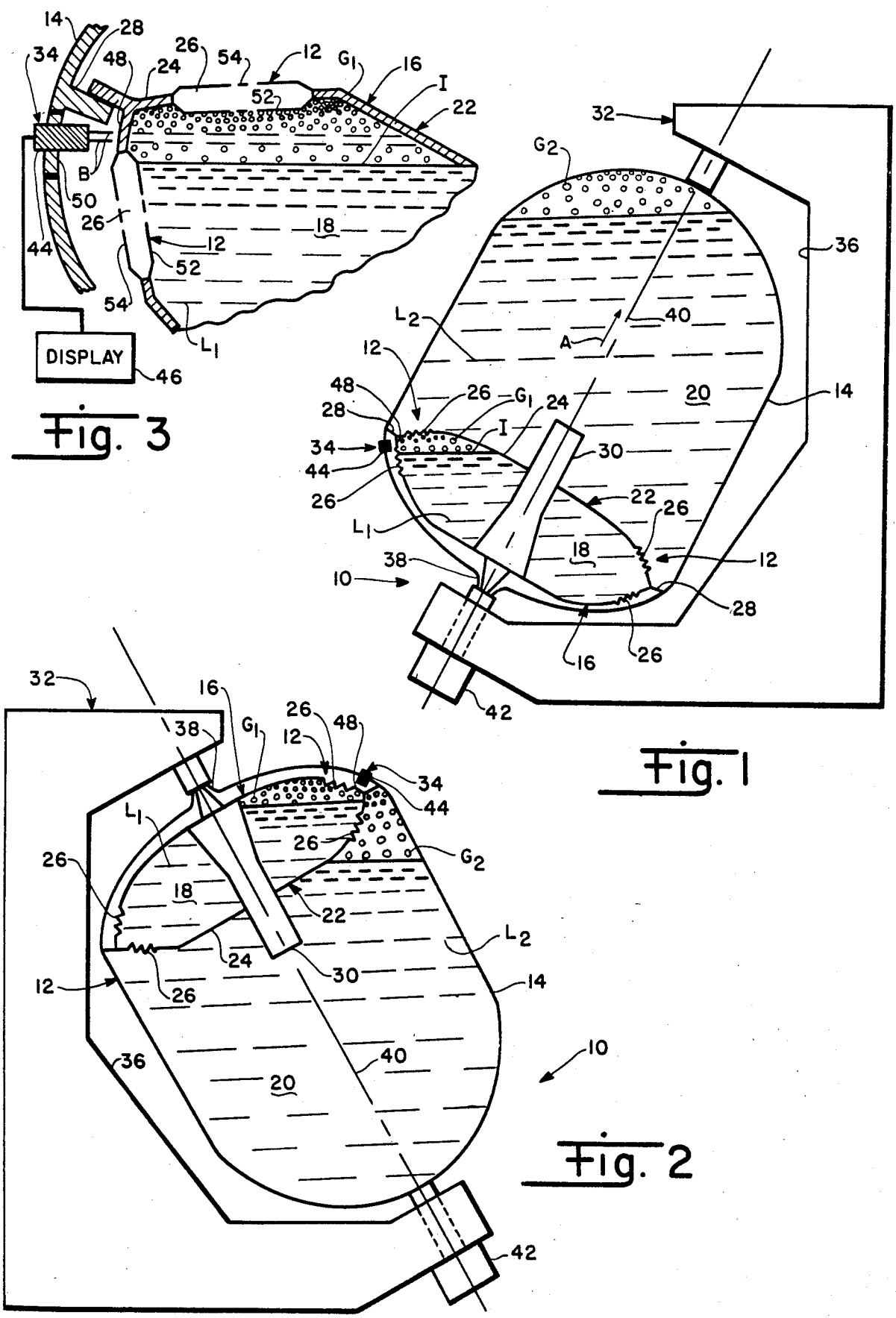

SURFACE TENSION SCREEN FAILURE DETECTION METHOD AND APPARATUS

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to the use of nondestructive testing for validating the integrity of a gas barrier member and, more particularly, is concerned with a method and apparatus for detecting surface tension screen failure using ultrasonics to measure variation in gas volumes on either side of the screen as a tank containing the screen is rotated.

2. Background of the Prior Art

A propellant tank for the Peacekeeper missile must be adapted to confine liquid propellant in such manner that a sufficient quantity of it will be available for delivery under zero gravity conditions. For this reason, the tank employs a propellant acquisition device (PAD) at one end which has a bulkhead containing several surface tension screens defining a holding chamber separated from the main chamber of the tank. A reasonably large ullage gas is present in the main chamber of the tank when the tank is in its fully loaded condition, while there is a minimal quantity of residual gas present in the PAD.

The bulkhead screens function in combination with the action of surface tension forces to maintain liquid propellant in the holding chamber at the delivery end of the tank and to replenish the holding chamber from the main chamber as the propellant is drawn from the holding chamber during firing of the missile. In order to serve their intended function, the screens must prevent gas flow between the main chamber and the PAD's holding chamber. The ability of gas to penetrate the screens will prevent the drawing of liquid propellant from the tank as the tank accelerates during missile firing.

The screens have a woven wire cloth construction and are rather delicate in nature. The primary desired characteristic of the screen is the ability to support a liquid column within the holding chamber through surface tension. Breakdown of meniscus between wires in the screen results in the flow of gas bubbles through the screen as the tank undergoes acceleration with the missile. In the case of screen failure, breaks in the wires of the metal cloth result in gas flow at a shorter liquid column. During ground handling of the tank when loaded with liquid propellant, high cycle fatigue and a single large flow impact on the screens may cause damage to them, allowing gas flow into the PAD. If a section of a screen dries out during storage, gas will also pass directly into the PAD from the main chamber. Further, during ascent of the missile, acceleration loads will force gas out of the PAD and back into the main chamber or upper section of the tank.

After the tank is assembled and filled, it is quite difficult to inspect the screens for bubble point degradation or damage due to ground handling. Therefore, a basic problem is to be able to test the assembled and partially filled tank to determine if the screens are damaged. The screens most susceptible to damage are those on the forward bulkhead of the PAD. Consequently, a need has arisen for a technique to validate surface tension screen integrity which does not compromise the pressure shell of the tank and which can be done at relatively low cost.

SUMMARY OF THE INVENTION

The present invention provides a method and apparatus for detecting surface tension screen failure designed to satisfy the aforementioned needs. Underlying the present invention is the use of ultrasonics for measuring gas volumes in the tank. This approach provides a simple, inexpensive way of measuring gas volume with no penetration of the tank pressure shell being required. Detection of any variation in gas volumes requires two orientations of the tank axis and slow axial rotation of the tank at each orientation to allow gas to flow through any defective bulkhead screen. One orientation allows gas to leak out of the PAD through a defective screen, while the other orientation allows gas to leak into the PAD. Measurements indicative of gas volume are made with an ultrasonic beam during rotation of the tank in each orientation. A defective screen will show a large difference between the measurements at the two orientations of the tank. The approach of the invention requires no seals and uses inexpensive equipment. Ultrasonic "windows" must be included in the tank design, but they do not compromise the integrity of the tank pressure shell. One or two transducers may be used and they can be permanently fixed to the exterior of the tank or can be designed for removal.

Accordingly, the present invention is directed to a method and apparatus for detecting failure of a gas barrier member, such as a surface tension screen, disposed between first and second chambers of a tank positioned in tandem relation along a longitudinal axis of the tank. Both chambers of the tank are substantially filled by a liquid with respective first and second volumes of a gas contained in the liquid. The detecting method and apparatus include the operative steps of: (a) orienting the tank with its longitudinal axis disposed in a first predetermined position relative to vertical such that gas contained in the first chamber is placed against a first surface of the member; (b) rotating the tank about its longitudinal axis such that the gas flows through any defect in the member from the first to the second chamber; (c) making a first measurement indicative of the volume of the gas in the first chamber; (d) orienting the tank with its longitudinal axid disposed in a second predetermined position relative to vertical such that gas contained in the second chamber is placed against a second, opposite surface of the member; (e) rotating the tank about its longitudinal axis such that the gas flows through any defect in the member from the second to the first chamber; and (f) making a second measurement indicative of the volume of the gas in the first chamber. A comparison of the first measurement with the second measurement gives an assessment of integrity of the gas barrier member. Any serious defect in the member will show a significant variation in the two measurements of gas volume.

More particularly, an ultrasonic beam is used for making the two separate measurements indicative of the volume of gas within the first chamber. The change in acoustic impedance of transmission of the beam through liquid as compared with transmission thereof through gas will cause a reflection and a change in amplitude of the ultrasonic beam. Thus, either one transducer, functioning as both a transmitter and receiver, or two transducers, one functioning as a transmitter and the other as a receiver, can be used. Rotation of the tank and receiving transducer therewith will cause the ultrasonic beam to cross the stationary interface between the gas and liquid in the first chamber of the tank. If the gas volume during making of the first measurement differs significantly from the gas volume during making of the second measurement, then the angular positions of the sensing transducer during respective rotations of the tank where the beam crosses the interface will differ significantly. Since the rotation angle at which the interface crosses the sensing beam is a unique and direct measure of gas volume, this relationship is predetermined for the tank configuration, transducer location and position of the tank axis relative to vertical. The relationship is then supplied as a curve or chart to allow gas volume to be associated with rotation angle during the detection test.

BRIEF DESCRIPTION OF THE DRAWINGS

FIG. 1 is a side elevational view in schematic form of the apparatus of the present invention for detecting surface tension screen failure, showing the tank which contains the screens with its longitudinal axis in a first predetermined position.

FIG. 2 is a side elevational view of the apparatus similar to that of FIG. 1, but showing the tank with its longitudinal axis in a second predetermined position.

FIG. 3 is an enlarged fragmentary sectional view, relative to FIG. 1, of the tank, an outboard corner of the PAD, and the transducer located just below the major mounting flange connecting the PAD to the tank.

DETAILED DESCRIPTION OF THE INVENTION

Before entering into a detailed description of the preferred embodiment of the apparatus for detecting surface tension screen failure using ultrasonics to measure gas volumes, it would first be of benefit to briefly discuss some general principles involved in ultrasonic testing.

Conventional Principles of Ultrasonic Testing

Sound is produced by a vibrating body and is itself a mechanical vibration of particles about an equilibrium position. The actual particles do not travel through the material away from the sound source. It is the energy produced, which causes the particles to vibrate, that is moving progressively through the medium. The frequencies above the audible range are referred to as ultrasonic. The longitudinal mode of propagation is the one most often used in ultrasonic testing. In this mode, the particles transmitting the wave of energy vibrate parallel to the direction of propagation. The wave in this mode is the most easily generated and detected. This wave mode can propagate in solids, liquids, and gases.

An important parameter in ultrasonic testing is the acoustic impedance of the test materials. When a sound beam impinges upon an interface between two materials, not all of the energy is reflected by the interface back through the first material, a portion of it passes into the second material. This latter statement is true except for an interface between a solid or a liquid and a gas, such as air, at which interface virtually 100 percent reflection occurs. Thus, the amount of energy passing into the second material depends on the acoustic impedance of the two materials. Impedance is indicated by the letter Z and is the product of the density of the material and velocity of sound in the material. The percentage of the incident sound that is reflected at an interface depends on: (1) the mismatch in impedance $Z_1/Z_2$, and (2) the angle of incidence. Z for a liquid is two orders of magnitude less than for a metal while Z for a gas is two orders of magnitude less than for a liquid. Thus, typically, when using two transducers to sense beam transmission, a gas bubble will eliminate transmission of a beam sized for transmission in a liquid. On the other hand, when using only one transducer to sense beam reflection, the impedance due to the reflection off the gas bubble can be used as a measure, or the input can be pulsed as in Sonar and the reflected amplitude measured.

Additional background information on ultrasonics and its application in nondestructive testing may be readily gained from an article by A. L. Smith, entitled "Ultrasonic Testing Fundamentals," appearing in *Materials Evaluation*, April and June 1978, pages 22-31 and pages 37-44, respectively.

Preferred Embodiment of the Present Invention

Turning now to the preferred embodiment of the present invention, FIG. 1 depicts in schematic fashion an apparatus, generally designated 10, for detecting failure of a surface tension screen 12 contained in a tank 14 intended for deployment and use, for example, on a Peacemaker missile (not shown) in environments having zero gravity as well as high accelerational forces.

Tank 14 includes a propellant acquisition device (PAD) 16 which defines a holding chamber 18 separate from a main chamber 20 in the tank. PAD 16 is formed by a bulkhead assembly 22 composed of a body 24 made from thin sheet metal impervious to both liquid and gas and of several segments 26 of the surface tension screen 12. Screen segments 26 are disposed in body 24 at an outer annular portion thereof adjacent to an annular flange 28 extending about the interior of tank 14 to which the body is connected and supported within the tank 14. PAD 20 also includes a vent tube 30 coupled to body 24 which allows passage of bubbles of gas $G_1$ from holding chamber 18 back to main chamber 20 when accelerative forces are imposed on ullage gases $G_1$ and $G_2$ and liquid propellants $L_1$ and $L_2$ in holding and main chambers 18,20 along the direction of the arrow A.

Detecting apparatus 10 includes a fixture 32 for supporting tank 14 and an ultrasonic device 34 for performing measurements indicative of or correlated with the volume of ullage gas $G_1$ within PAD holding chamber 18 which provide information contemplated by the present invention. Fixture 32 includes a frame 36 for supporting tank 14 in either of two test orientations, one with the tank nose 38 pointing downwardly and tank central longitudinal axis 40 tilted at about 60° to the horizontal, as seen in FIG. 1, and the other with tank nose 38 pointing upwardly and the tank axis 40 tilted at about 60° to the horizontal as seen in FIG. 2. Fixture 32 also includes a drive mechanism 42 which couples with opposite portions of tank 14 along its longitudinal axis 40 and is operable to rotate tank 14 slowly about axis 40.

Ultrasonic device 34 can employ either one or two transducers. In the embodiment illustrated in FIG. 3, one transducer 44 is used which functions as both transmitter and receiver or sensor, and is connected to a suitable signal display 46. It will transmit ultrasonic beam B and sense the reflection therefrom. The interface I between the gas $G_1$ and liquid $L_1$ will cause a reflection which is sensed by transducer 44 and displayed by display 46. Alternatively, two transducers can be used, one as the transmitter and the other as the sensor. The presence of the gas $G_1$ will eliminate transmission of an ultrasonic beam sized for transmission in the liquid $L_1$.

Irrespective of whether one or two transducers are used, the basis of both is that a change in acoustic impedance will cause a reflection and a change in amplitude of the ultrasonic beam. The location of transducer(s) 44 is preferably chosen to be on the tank outlet side of the large diameter mounting flange 28. Transducer 44 directs the beam B toward the thin sheet metal section 48 of body 24 so that gas $G_1$ against the inside of section 48 can be sensed. While in theory beam B could be directed through screen segment 26, convolutions of the screen itself could provide local gas traps and produce an erroneous measure of the edge of the PAD ullage gas $G_1$. In this setup, the sensing window 50 in the tank 14 is solid metal and an integral part of the tank. Therefore, the seal of the tank shell is not required to be perforated to perform the measurements contemplated by the present invention. Ultrasonic transducer 44 can be permanently fixed to window 50, as seen in FIG. 3, or could be designed for removal.

In the method of the present invention, tank 14 is first placed on support frame 36 of fixture 32 with nose 38 pointing in a downwardly direction (FIG. 1) and longitudinal axis 40 oriented at approximately 60° above horizontal and 30° to the right of vertical. Then, tank 14 is rotated slowly in a counterclockwise direction about axis 40. As tank 14 is rotated, any gas $G_1$ within holding chamber 18 of PAD 16 will contact the inside (or lower) surfaces 52 of screen segments 26. Any defect present in screen segments 26 will allow gas $G_1$ to escape from the PAD holding chamber 18 into main chamber 20. After slow rotation of tank 14 through 360° to allow gas to escape from chamber 18, a first measurement indicative of the volume of the gas $G_1$ in holding chamber 18 is made.

Next, the orientation of tank 14 on the support frame 36 is reversed. Tank 14 is placed on frame 36 with its nose 38 pointing in an upward direction (FIG. 2) and longitudinal axis 40 at approximately 60° above horizontal and 30° to the left of vertical. Again, tank 14 is rotated slowly in a counterclockwise direction. As the tank rotates, any gas $G_2$ within main chamber 20 will contact the outside (or lower) surfaces 54 of screen segments 26. Any defect present in screen segments 26 will allow gas $G_2$ to escape from main chamber 20 back into holding chamber 18. After rotation of tank 14, a second measurement indicative of the volume of gas $G_1$ in holding chamber 18 is made. A comparison of the two measurements gives an assessment of screen integrity. Any serious screen defect will show up as a significant variation in the gas volume indicated by the two measurements.

An ultrasonic beam B transmitted and received by transducer 44 is made for making the two separate measurements correlated with the volume of gas $G_1$ within the holding chamber 18. With transducer 44 located on tank 14 adjacent to where the interface I between gas $G_1$ and liquid $L_1$ within holding chamber 18 is expected to be, rotation of tank 14 and transducer 44 therewith will cause the ultrasonic beam to cross the stationary interface I. If the gas volume indicated by the first measurement differs significantly from the gas volume indicated by the second measurement, then the angular positions of transducer 44 with respect to the same starting positions where the beam crosses interface I will differ significantly. After obtaining some experience in performing the method, an operator will be able to tell when a significant difference is present without actually calculating the volumes of the gas. Since the rotation angle at which the interface I crosses the sensing beam is a unique and direct measure of gas volume, this relationship is predetermined for the particular tank 14 configuration, transducer 44 location and position of axis 40 relative to vertical. The relationship is then supplied as a curve or chart to allow gas volume to be associated with rotation angle during the detection test.

It is thought that the detecting method and apparatus of the present invention and many of their attendant advantages will be understood from the foregoing description and it will be apparent that various changes may be made in the steps of the method and the form, construction and arrangement of the parts of the apparatus without departing from the spirit and scope of the invention or sacrificing all of its material advantages, the form hereinbefore described being merely a preferred or exemplary embodiment thereof.

We claim:

1. A method for detecting failure of a gas barrier member, such as a surface tension screen, disposed between first and second chambers of a tank positioned in tandem relation along a longitudinal axis of the tank, said chambers being substantially filled by a liquid with respective first and second volumes of a gas contained in said liquid, said method comprising the steps of:
   a. orienting said tank with its longitudinal axis disposed in a first predetermined position such that gas contained in said first chamber is placed against a first surface of said member;
   b. rotating said tank about its longitudinal axis such that said gas flows through any defect present in said member from said first to said second chamber;
   c. making a first measurement indicative of the volume of said gas in said first chamber;
   d. orienting said tank with its longitudinal axis disposed in a second predetermined position such that said gas in said second chamber is placed against a second surface of said member opposite said first surface;
   e. rotating said tank about its longitudinal axis such that said gas flows through any detect present in said member from said second to said first chamber; and
   f. making a second measurement indicative of the volume of said gas in said first chamber, whereby a comparison of said measurements provides an assessment of the integrity of said member.

2. The method as recited in claim 1, wherein said tank in said first predetermined position is oriented with said first chamber disposed generally below said second chamber and said axis extends at an acute angle above horizontal and to the right of vertical.

3. The method as recited in claim 2, wherein said acute angle is approximately 60° above horizontal.

4. The method as recited in claim 1, wherein said tank in said second predetermined position is oriented with said second chamber disposed generally below said first chamber and said axis extends at an acute angle above horizontal and to the left of vertical.

5. The method as recited in claim 4, wherein said acute angle is approximately 60° above horizontal.

6. The method as recited in claim 1, wherein each of said first and second measurement making steps includes transmitting and receiving an ultrasonic beam within said first chamber adjacent an interface between said gas and liquid therein so as to detect the angular position of said tank when said beam crosses said interface.

7. An apparatus for detecting failure of a gas barrier member, such as a surface tension screen, disposed between first and second chambers of a tank positioned in tandem relation along a longitudinal axis of the tank, said chambers being substantially filled by a liquid with respective first and second volumes of a gas contained in said liquid, said detecting apparatus comprising the steps of:
 a. means for orienting said tank with its longitudinal axis disposed in one of first and second predetermined positions such that gas contained in said first chamber of said tank is placed against a first surface of said member when said tank is in said first position and is placed against a second surface of said member opposite said first surface when said tank is in said second position;
 b. means for rotating said tank about its longitudinal axis while it is oriented in each of said first and second positions such that gas flows through any defect present in said member from said first to said second chamber when said tank is in said first position and from said second to said first chamber when said tank is in said second position; and
 c. means for making first and second measurements indicative of the volume of gas in said first chamber while said tank is rotated respectively in said first and second positions, whereby a comparison of said measurements provides an assessment of the integrity of said member.

8. The apparatus as recited in claim 7, wherein said orienting means includes a support fixture.

9. The apparatus as recited in claim 8, wherein said tank in said first predetermined position is oriented by said support fixture with said first chamber below said second chamber and said axis extends at an acute angle above horizontal and to the right of vertical.

10. The apparatus as recited in claim 9, wherein said acute angle is approximately 60° above horizontal.

11. The apparatus as recited in claim 8, wherein said tank in said second predetermined position is oriented by said support fixture with said second chamber below said first chamber and said axis extends at an acute angle above horizontal and to the left of vertical.

12. The apparatus as recited in claim 11, wherein said acute angle is approximately 60° above horizontal.

13. The apparatus as recited in claim 7, wherein said rotating means includes a drive mechanism disposed on said fixture and coupled to said tank.

14. The apparatus as recited in claim 7, wherein said means for making said first and second measurements includes:
 means for transmitting and receiving an ultrasonic beam within said first chamber adjacent an interface between said gas and liquid therein; and
 means for detecting the angular position of said tank when said beam crosses said interface.

15. The apparatus as recited in claim 14, wherein said transmitting and receiving means is in the form of a ultrasonic transducer mounted on said tank.

* * * * *